(12) United States Patent
Sidlinger et al.

(10) Patent No.: US 7,171,737 B2
(45) Date of Patent: Feb. 6, 2007

(54) SAFETY BARRIER

(75) Inventors: Matthew R. Sidlinger, Clinton, IA (US); Jan C. Mangelsen, Charlotte, IA (US); John P. Christen, Davenport, IA (US); Harlon Neumann, Hampton, IL (US); Mike Skahill, Pleasant Valley, IA (US); Greg Judge, LeClaire, IA (US)

(73) Assignee: GSG, LLC, Davenport, IA (US)

( * ) Notice: Subject to any disclaimer, the term of this patent is extended or adjusted under 35 U.S.C. 154(b) by 507 days.

(21) Appl. No.: 10/661,253

(22) Filed: Sep. 12, 2003

(65) Prior Publication Data

US 2005/0057890 A1 Mar. 17, 2005

(51) Int. Cl.
*B23Q 7/00* (2006.01)
*B25B 27/14* (2006.01)
*E05F 11/00* (2006.01)

(52) U.S. Cl. .......................... 29/559; 29/281.4; 49/360
(58) Field of Classification Search ................. 29/559, 29/281.4; 49/360, 103, 73.1; 192/130, 134; 160/121.1, 133, 310; 74/615
See application file for complete search history.

(56) References Cited

U.S. PATENT DOCUMENTS

| 4,402,389 A | | 9/1983 | Adams et al. |
| 4,488,630 A | | 12/1984 | Plumb |
| 5,271,183 A | * | 12/1993 | Hahn et al. .................... 49/360 |
| 5,450,890 A | | 9/1995 | Pinkalla et al. |
| 5,579,884 A | | 12/1996 | Appleyard et al. |
| 6,402,239 B1 | * | 6/2002 | Haglund ................. 297/216.13 |

* cited by examiner

*Primary Examiner*—John C. Hong
(74) *Attorney, Agent, or Firm*—McKee, Voorhees & Sease, P.L.C.

(57) ABSTRACT

A rollup barrier is provided for a robotic station. The barrier includes a track having a tapered portion at its lower end. A switch is mounted at the extreme lower end of the track. The switch prevents actuation of the robotic equipment unless the barrier is moved to its extreme lowermost position. Extensible cylinders are used for connection to a chain trained around a sprocket in order to roll the roller.

9 Claims, 6 Drawing Sheets

SAFETY BARRIER

BACKGROUND OF THE INVENTION

The present invention relates to a safety barrier and method for using same. Rollup barriers have been utilized in the past.

FIG. 6 shows a typical prior art rollup barrier. This barrier is designated by the numeral 10 and includes a work piece holder 12 which is adapted to hold a work piece (not shown). The work piece holder 12 is surrounded by fixed side barriers 14 and an inner barrier 16. A roller 18 is mounted above and forwardly of the work piece holder and includes a flexible barrier 20 which is rolled thereon. The barrier 20 moves from the uppermost position shown in FIG. 6 to a lowermost position wherein the free end 22 is positioned adjacent the supporting surface. A pair of tracks 24 guide the flexible barrier as it moves to its lowermost position. The prior art work station 10 operates the roller 18 by use of a electric motor 29.

A plurality of cells 28 project a plurality of light beams creating a light sheet 26. The purpose of this light sheet 26 is to detect when an operator is positioned between the barrier 20 and the work station 12 after the barrier 20 has been lowered to its lowermost position. If the light shield detects a worker in this area, the light shield causes any robotic equipment to be deactuated so that it cannot be actuated until the worker is removed from the area designated by the light shield 26. It would be desirable to devise a flexible barrier which does not rely upon the light shield 26 for detecting an operator positioned between the barrier 20 and the work station 12.

Therefore, a primary object of the present invention is the provision of an improved safety barrier and method for using same.

A further object of the present invention is the provision of an improved safety barrier which eliminates the need for a light sheet at the lower end of the device for detecting an operator located in a dangerous position.

A further object of the present invention is the provision of an improved safety barrier and method for using same which includes a track that guides the safety barrier inwardly towards the work piece holder to a position wherein the lower end of the barrier is sufficiently close to the work piece holder to prevent an operator from being located therebetween.

A further object of the present invention is the provision of a safety barrier and method for using same which utilizes a mechanical switch located at the lower end of the barrier which can only be activated to activate the robotic equipment for working on the work piece when the barrier has been moved to its lowermost position.

A further object of the present invention is the provision of a safety barrier and method for using same which uses pneumatic cylinders for moving the barrier and unrolling the roller.

A further object of the present invention is the provision of an improved safety barrier and method for using same which is economical to manufacture, durable in use, and efficient in operation.

SUMMARY OF THE INVENTION

The foregoing objects can be achieved by a safety barrier for a work station having a support surface, a work piece holder on the support surface having a front and a rear end, a work piece being held by the work piece holder, and a tool adapted to engage and perform tasks on the work piece. The barrier comprises a first frame member and a second frame member mounted on the supporting surface on the opposite sides of the work piece. An elongated roller extends between the first and second frames and is mounted for rotation about a longitudinal roller axis located in spaced relation above the supporting surface. A flexible safety barrier is rolled upon the roller and includes an upper barrier end attached to the roller and a free barrier end adapted to move from a rolled up position adjacent the roller to a rolled down position adjacent the supporting surface in response to rotation of the roller about the roller axis. Each of the first and second frame members includes a guide for guiding the flexible barrier as the free end of the barrier moves from the rolled up position to the rolled down position. The guides of the first and second frame members guide the lower barrier sufficiently close to the work piece holder to avoid space therebetween sufficient for a human being standing on the support surface. A switch is electrically connected to the tool and has an inoperative position preventing actuation of the tool and an operative position permitting actuation of the tool. The switch is biased to the inoperative position and is located so as to be responsive to engagement by the free end of the flexible barrier to move from the inoperative position to the operative position only when the free end of the flexible barrier is in the rolled down position.

According to another feature of the invention, a sprocket is mounted to the roller and a chain is trained around the sprocket. The chain includes a first chain end and a second chain end on opposite sides of the sprocket. First and second prime movers are connected to the first and second chain ends respectively and are adapted to move the chain on the sprocket to cause the roller to rotate and move the flexible barrier between its rolled up and rolled down positions.

According to another feature of the present invention, the first and second prime movers each comprise an elongated cylinder and a piston and rod assembly longitudinally extensible relative to the cylinder.

According to another feature of the present invention, the guides of the first and second frame members each comprise an elongated track, the flexible barrier having track followers guided within and by the tracks of the first and second frame members.

According to another feature of the present invention, the track followers comprise a plurality of wheels mounted for movement in the elongated tracks of the first and second frame members.

According to another feature of the present invention, the roller is positioned above or to the rear of the front end of the work piece holder, and a crane includes a support member positioned in front of the roller for lifting the work piece and holding the work piece for attachment to the work piece holder.

According to another feature of the present invention, the tracks each include an upper track end positioned above or to the rear of the front end of the work piece holder, an intermediate track positioned in spaced relation in front of the work piece holder, and a lower track extending in a rear direction from the intermediate track.

According to the method of the present invention, the work piece is mounted to a work piece holder having a front end and a rear end. A tool is utilized for performing functions on the work piece holder and the tool includes an actuated state and a non-actuated state. A flexible barrier includes an upper end and free end in front of the work piece holder. The flexible barrier is lowered to its lowered position wherein the upper end of the barrier is above the work piece and the free end of the barrier is located below the work piece and sufficiently close to the front end of the work piece holder to prevent a human being from standing on the supporting surface between the work piece holder and the free end of the barrier.

The method further comprises preventing the lower end of the flexible barrier from moving to the lowered position if a human being is positioned between the work piece holder and the free end of the barrier.

The method further comprises moving a switch from a normal position preventing actuation of a tool to a second position actuating the tool only in response to the movement of the free end of the barrier to its lowered position. The switch remains in the normal position at all other times.

DETAILED DESCRIPTION OF THE PREFERRED EMBODIMENT

Figure 1:
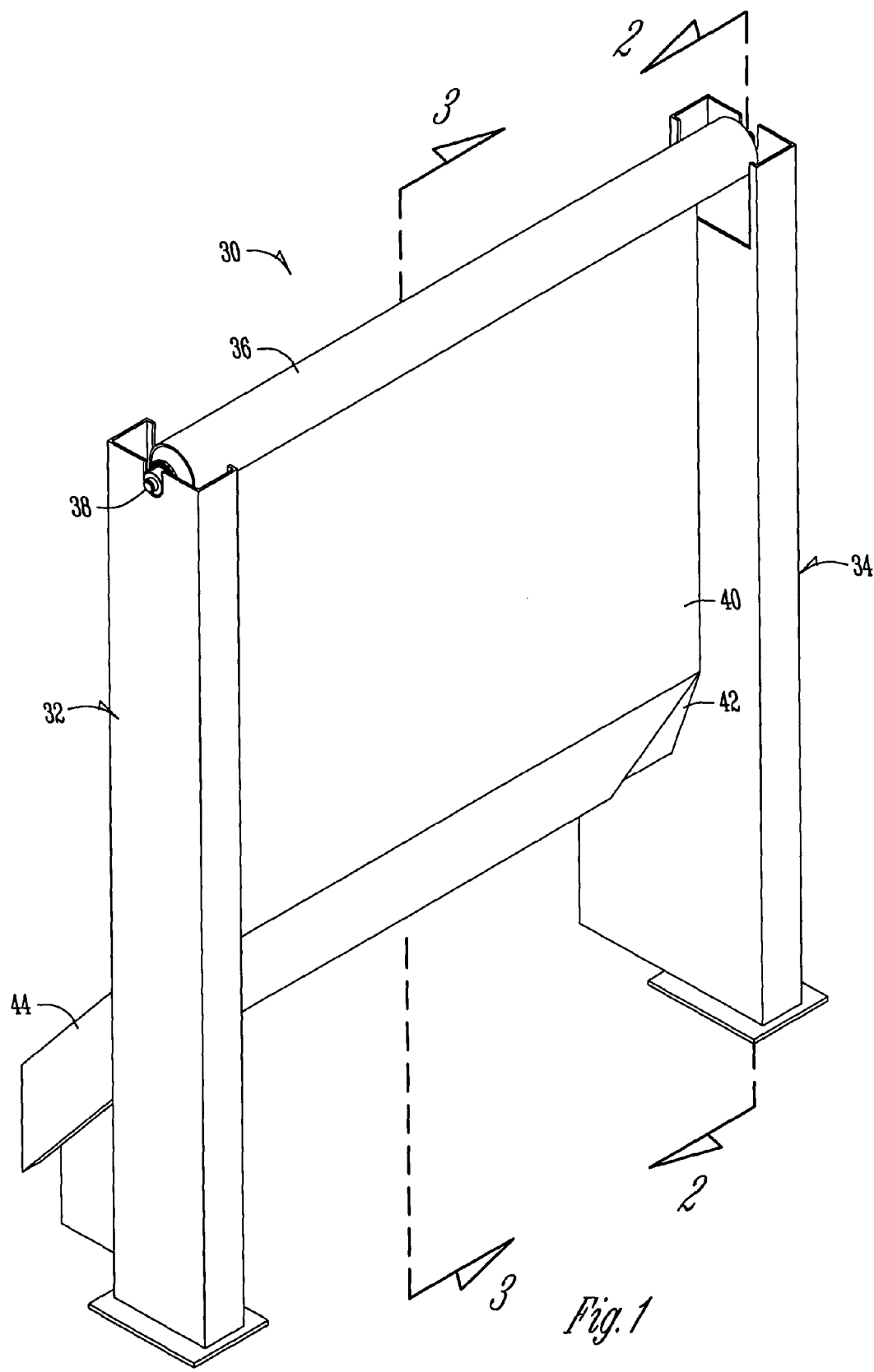
FIG. 1 is a perspective view of the barrier of the present invention.

Referring to FIGS. 1–4, the numeral 30 designates the barrier assembly of the present invention. Barrier assembly 30 includes a first frame member 32 and a second frame member 34 positioned in spaced relation to one another. A roller 36 extends between the first and second frame members and is rotatably mounted thereon for rotation about a roller axis 38. Rolled upon the roller 36 is a roll up barrier 40. A pair of guide tracks 42 are provided in each of the first and second frame members 32, 34. And at the lower ends of guide tracks 42 are a pair of guide beams 44 which are angled away from the vertical orientation of the upper portions of the guide tracks 42. Each guide track 42 includes an upper end 46, a vertical middle 48, and an angled lower end provided by the guide beams 44. Guide beams 44 are C-shape in cross section and include flanges 52.

The barrier 40 includes a plurality of cross bars 54 mounted therein. The cross bars have rollers 56 at their opposite ends which are guided within the guide tracks 42 and the channels provided by the angled lower ends 50 of the guide tracks 42. The barrier 40 includes a free end 58 which move from its uppermost position adjacent the roller 36 to its lowermost position shown in FIG. 3. In its lowermost position, the free end 58 is angled away from the vertical plane of the vertical middle 48 of the guide tracks 42 and toward the front end 82 of the workstation. A switch 60 is mounted at the extreme lower end of the guide track 42 and includes a switch arm 62. Switch 60 is adapted to normally be in an inoperative position, and is connected to a robotic tool 68. When in its inoperative position, the switch prevents actuation of the robotic tool 68. However, the switch arm 62 is movable to an operative position in response to being engaged by the free end 58 of the barrier 40. When so engaged (as shown in FIG. 3), the switch arm moves and causes the switch to move to its operative position thereby freeing the robotic tool 68 to be actuated for performing a function on a work piece 66 held in a work piece holder 64.

Figure 3:
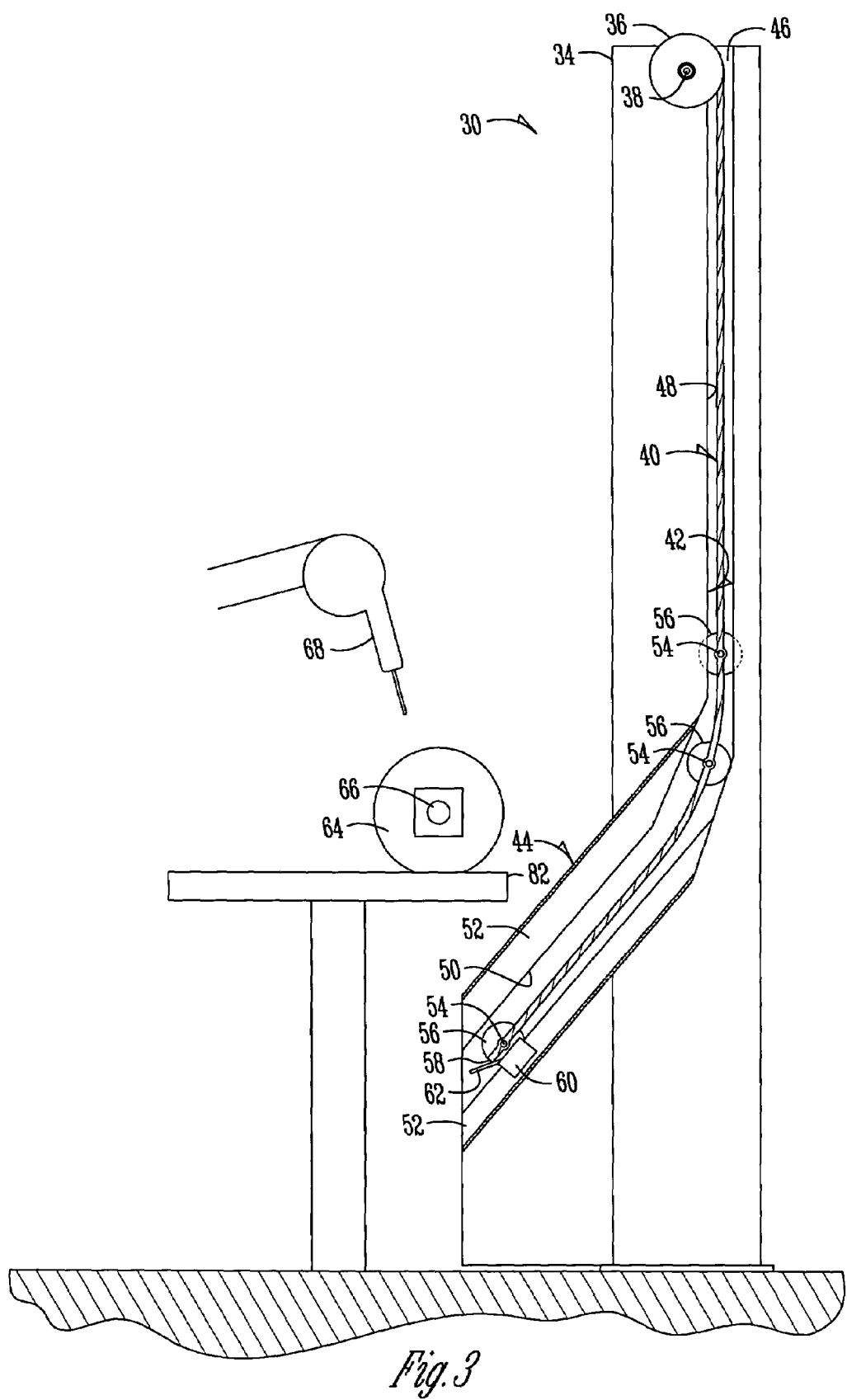
FIG. 3 is a sectional view taken along line 3—3 of FIG. 1 and showing the relationship of the device to a robotic work station.
Figure 4:
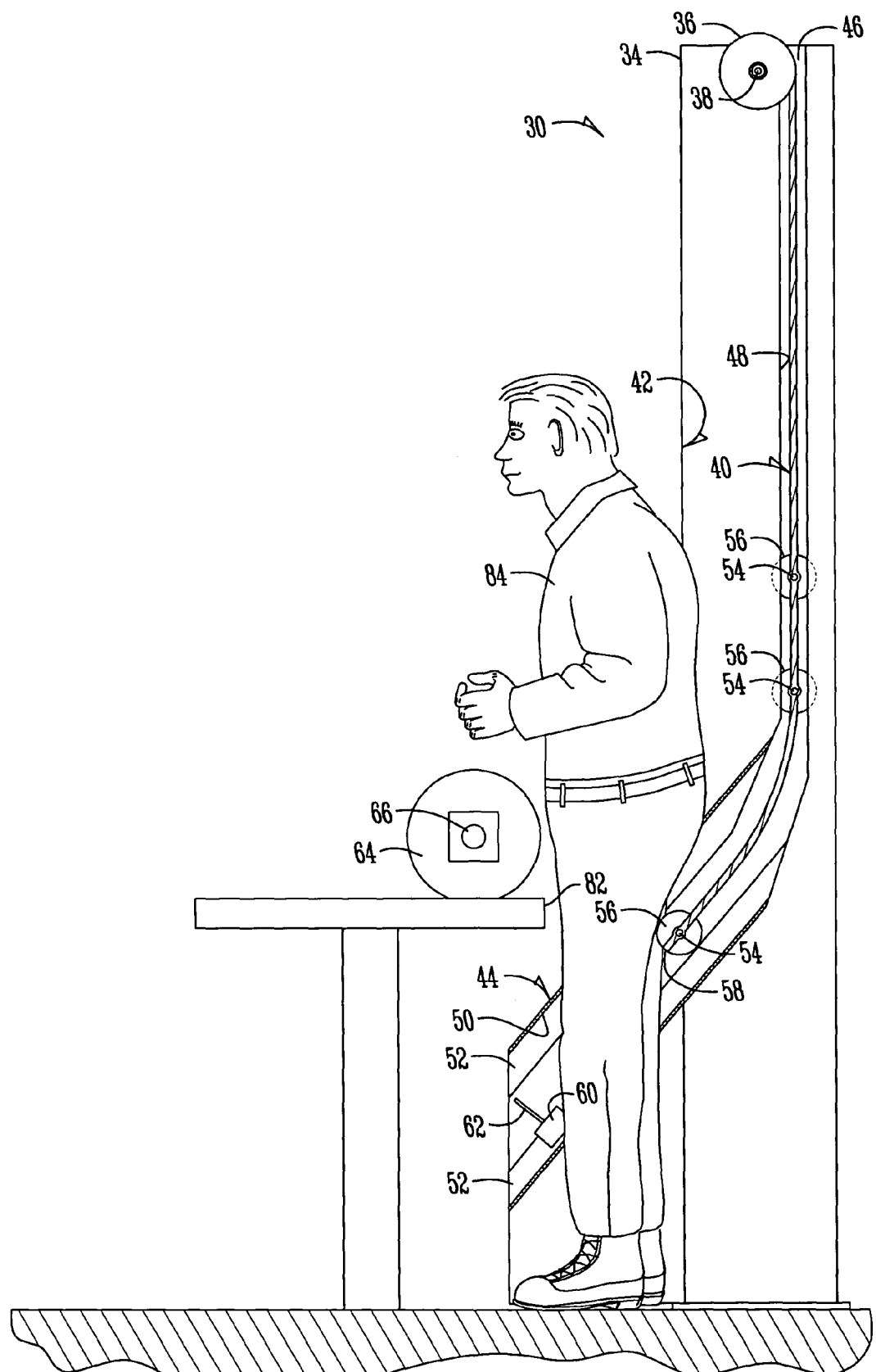
FIG. 4 is a sectional view similar to FIG. 3, but showing an operator positioned between the lower end of the barrier and the work piece holder.

FIGS. 3 and 4 shows the relative position of the guide track 42 and the barrier 40 to the work piece holder 64 and the work piece 66. The work piece holder 64 includes a front end 82 which is positioned in very close vertical alignment with the free end 58 of the barrier 40 when the free end is in its lowermost position. The closeness of front end 82 and switch 60 should be such that there is insufficient space for a worker to stand between the two. In FIG. 3 the free end 58 is shown to be slightly beneath the front edge 82 of the work piece holder 64. While it is not necessary that there be overlapping, it is important that the free end of the barrier 58 be located sufficiently close to the front edge 82 of the work piece holder to prevent an operator from being positioned therebetween. FIG. 4 shows what happens when an operator is positioned between the baffler and the front edge 82 of the work piece holder 64. The worker engages the free end 58 of the baffler before the baffler reaches its lowermost position, and before the free end 58 can engage the switch arm 62. Thus when an operator such as 84 is positioned between the baffler 40 and the front of the work piece holder 82, the worker prevents the barrier from moving to its lowermost position and therefore prevents the ability of the robotic tool 68 to be actuated.

Figure 2:
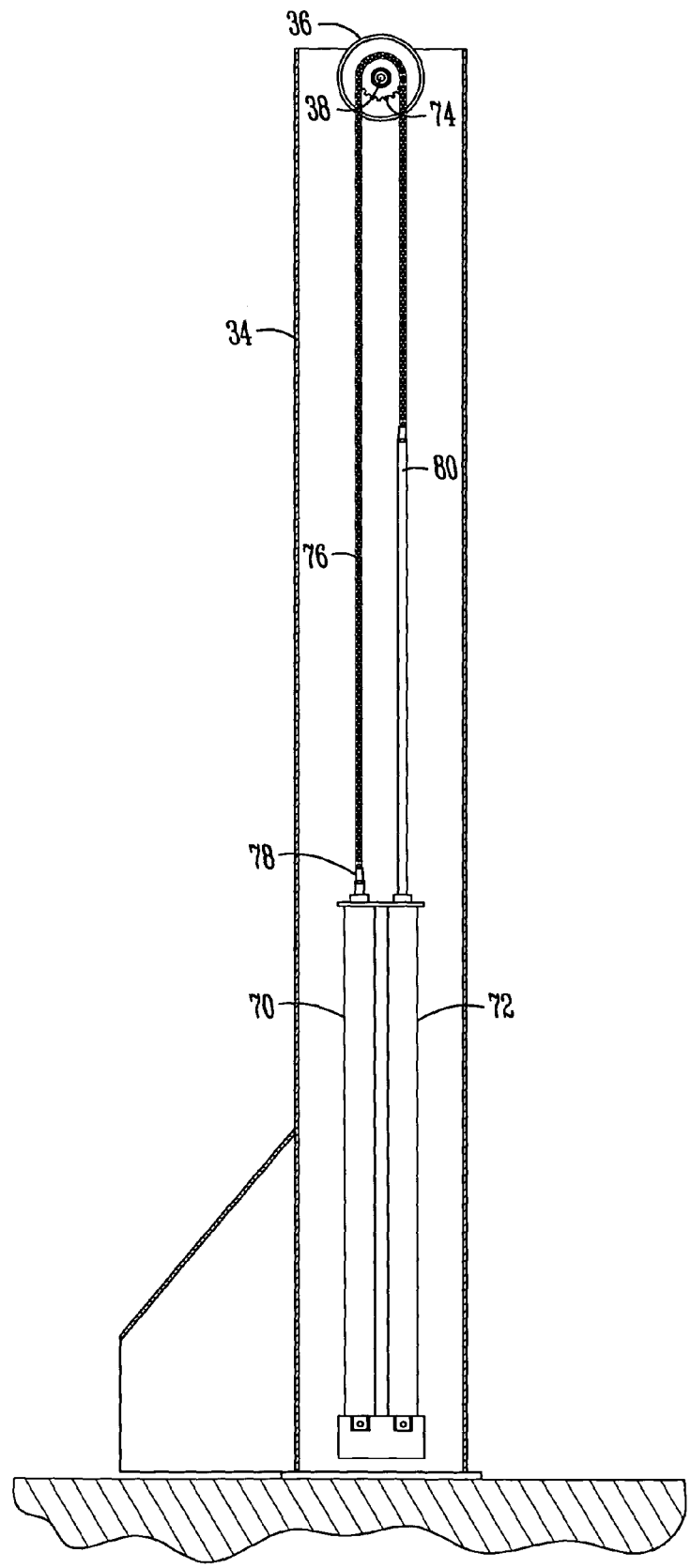
FIG. 2 is a sectional view taken along line 2—2 of FIG. 1.

FIG. 2 illustrates the manner for operating the roller 36. A first cylinder 70 and a second cylinder 72 are attached at their lower ends to the support frame 34. A sprocket 74 is attached to the roller 36 and rotates about the axis 38. Sprocket 74 has a chain 76 trained around it and one end of the chain 76 is connected to a first rod and piston assembly 78 and the other end of the chain 76 is connected to the second rod and piston assembly 80. As can be seen in FIG. 2, the second assembly 80 is extended and the first assembly 78 is retracted. Rotation of the sprocket 74 can be accomplished by extending the rod and piston assembly 78 and by retracting the rod and piston assembly 80. Reverse rotation can also be achieved by reversing this extensible action. Thus it is possible to rotate the roller 36 and cause the barrier to move between its uppermost position and its lowermost position. The free end 58 of the barrier 40 is propelled by gravity only in response to the rotation of the roller 36. Therefore, as shown in FIG. 4, if a person 84 engages the free end 58, the downward movement of the free end 58 stops and the barrier 40 merely begins folding in response to the rotation of the roller 36. It has been found that the use of extensible cylinders 70, 72 and piston and rod assemblies 78, 80 creates a faster and more efficient movement of the roller than has been previously achieved with electric motors.

Figure 5:
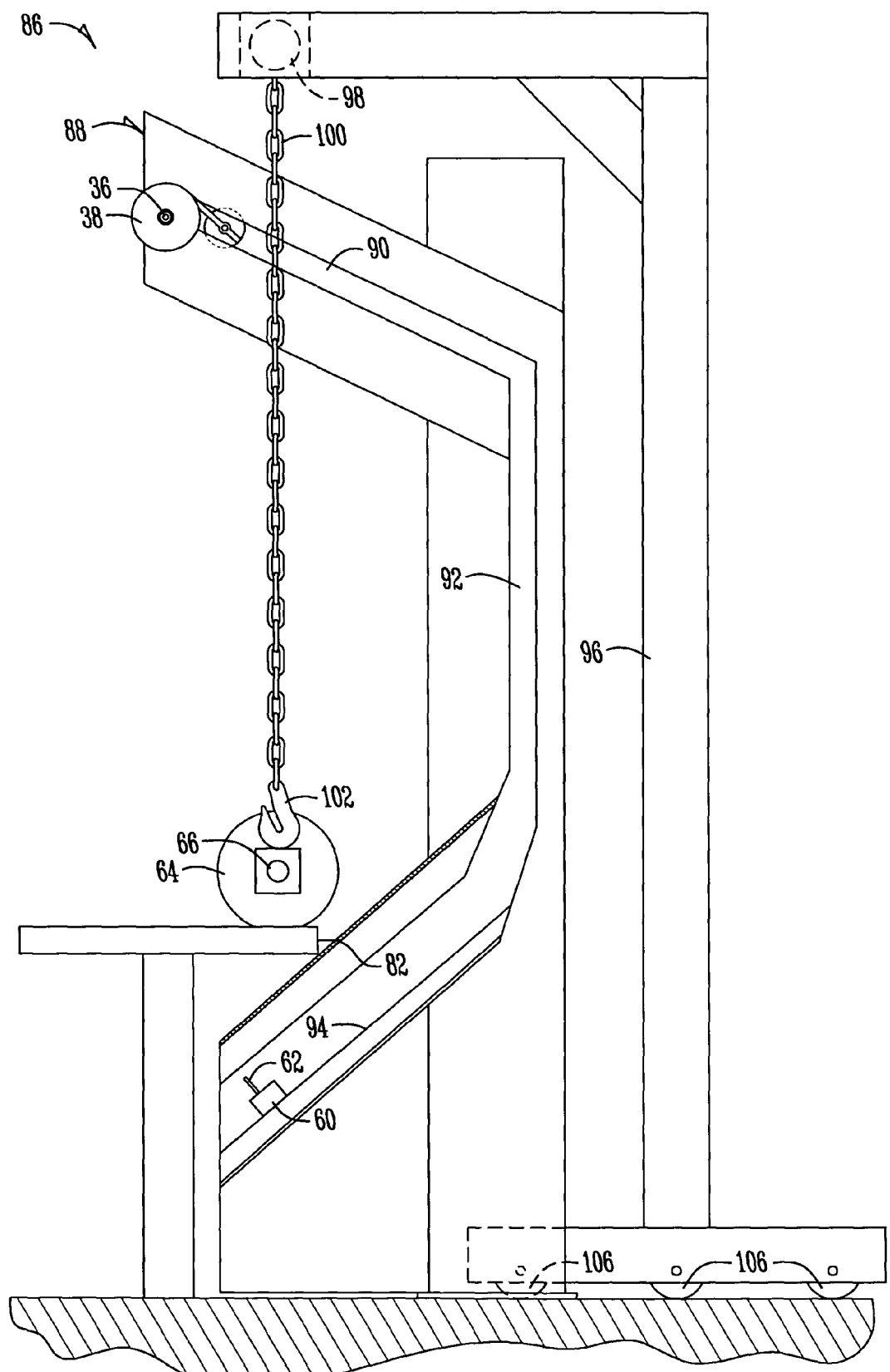
FIG. 5 is a sectional view similar to FIGS. 3 and 4, but showing a modified form of the invention.
Figure 6:
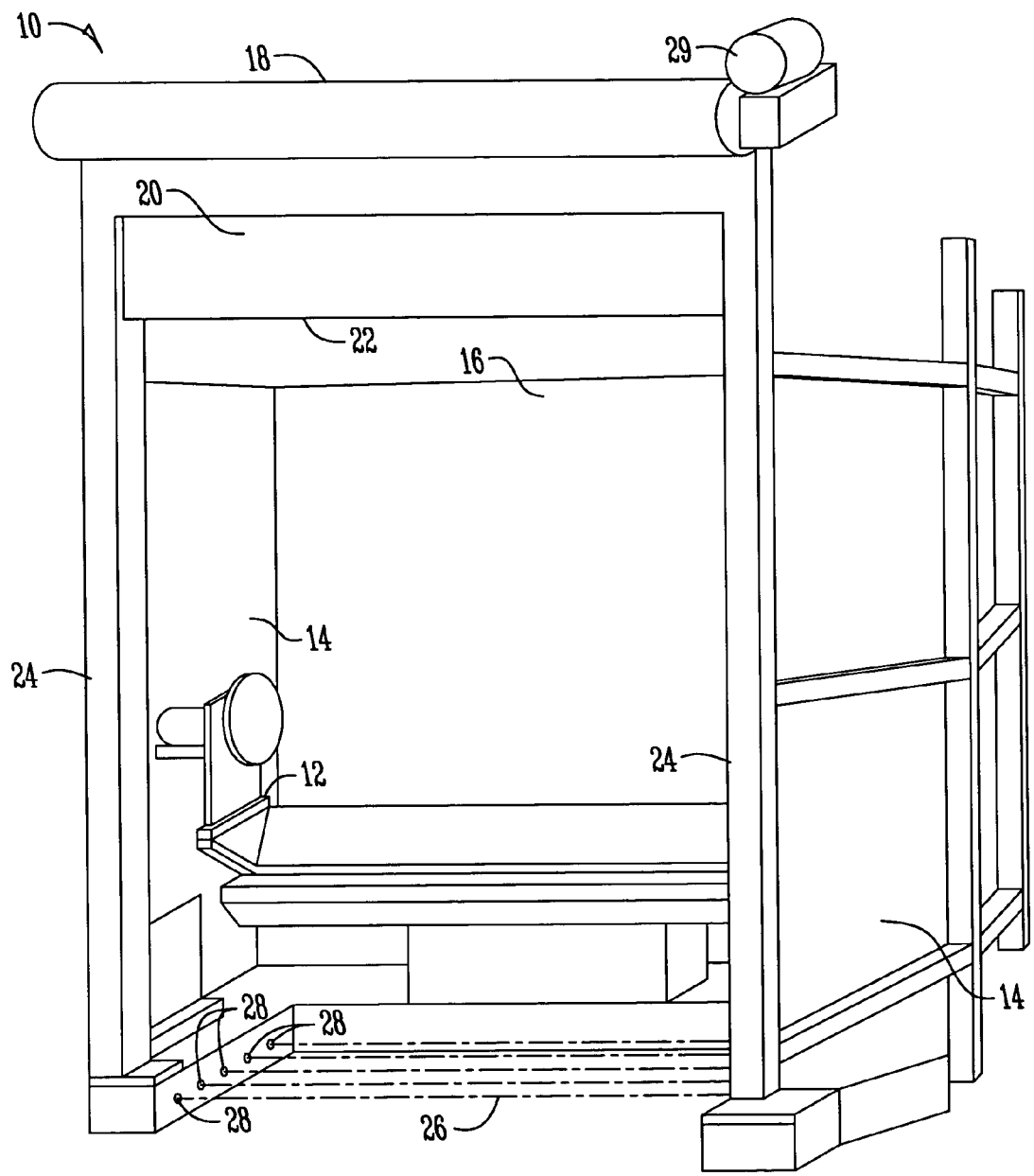
FIG. 6 is a perspective view showing a prior art barrier.

FIG. 5 illustrates an alternative form of the invention designated by the numeral 86. The barrier 86 shows a frame 88 which includes an upper angled end 90 for the track and an intermediate vertical portion 92 for the track, and a lowered angled end 94 for the track. A crane 96 includes a movable crane support 98 and a cable 100 having a hook 102 on its lower end. The crane 96 is shown mounted on rollers 104 so it can be moved into position. Other numerals correspond to the numerals set forth in FIGS. 1–4.

The advantage of the modified form shown in FIG. 5 is that the roller 38 is out of the way of crane 96 so that heavy work objects can be loaded by the crane 96 onto the work support 82 without encountering interference from the roller 36. The lower end 94 of the track is essentially the same as shown in FIGS. 1–4.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A safety barrier for a work station having a support surface, a work piece holder on the support surface and having a front end and a rear end, a work piece being held by the work piece holder, and a tool adapted to engage and perform tasks on the work piece, the barrier comprising:
    a first frame member and a second frame member mounted to the support surface on opposite sides of the work piece;
    an elongated roller extending between the first and second frames and being mounted for rotation about a longitudinal roller axis located in spaced relation above the supporting surface;
    a flexible safety barrier rolled up on the roller and having an upper barrier end attached to the roller and a free barrier end adapted to move from a rolled up position adjacent the roller to a rolled down position adjacent the supporting surface in response to rotation of the roller about the roller axis;
    each of the first and second frame members having a guide for guiding the flexible barrier as the free end of the barrier moves from the rolled up position to the rolled down position;
    the guides of the first and second frame members guiding the lower barrier end sufficiently close to the work piece holder to eliminate sufficient space there between for a human being standing on the support surface; and
    a switch electrically connected to the tool and having an inoperative position preventing actuation of the tool and an operative position permitting actuation of the tool, the switch being biased to the inoperative position and being located so as to be responsive to engagement by the free end of the flexible barrier and to move from the first position to the second position only when the free end of the flexible barrier is in the rolled down position.

2. A safety barrier according to claim 1 and further comprising a sprocket mounted on the roller, a chain trained around the sprocket and having a first chain end and a second chain end on opposite sides of the sprocket, first and second prime movers connected to the first and second chains respectively and being adapted to move the chain on the sprocket to cause the roller to rotate and move the flexible barrier between the rolled up and rolled down positions.

3. The safety barrier according to claim 2 wherein the first and second prime movers each comprise an elongated cylinder and a piston and rod assembly longitudinally extensible relative to the cylinder.

4. The safety barrier according to claim 3 wherein the cylinder and piston and rod assembly are pneumatically operated.

5. The safety barrier according to claim 1 wherein the guides of the first and second frame members each comprise an elongated track, the flexible barrier having track followers guided within and by the tracks of the first and second frame members.

6. The safety barrier according to claim 5 wherein the track followers comprise a plurality of wheels mounted for rolling movement in the elongated tracks of the first and second frame members.

7. The safety barrier of claim 1 wherein the roller is positioned above or to the rear of the front end of the work piece holder, and a crane includes a support member positioned in front of the roller for lifting the work piece and holding the work piece for attachment to the work piece holder.

8. The safety barrier according to claim 7 wherein the guides each include an upper track end positioned above or to the rear of the front end of the work piece holder, an intermediate track positioned in spaced relation in front of the work piece holder, and a lower track extending in a rear direction from the intermediate track.

9. In combination:
    a supporting surface;
    a work piece holder mounted on the supporting surface and having a front end and a rear end
    a work piece detachably mounted to the work piece holder;
    a tool assembly supported on the supporting surface and having a tool end movable to the work piece for performing tasks on the work piece;
    a first frame member and a second frame member mounted to the supporting surface on opposite sides of the work piece;
    an elongated roller extending between the first and second frames and being mounted for rotation about a longitudinal roller axis located in spaced relation above the supporting surface;
    a flexible safety barrier rolled up on the roller and having an upper barrier end attached to the roller and a free barrier end adapted to move from a rolled up position adjacent the roller to a rolled down position adjacent the supporting surface in response to rotation of the roller about the roller axis;
    each of the first and second frame members having a guide for guiding the flexible barrier as the free end of the barrier moves from the rolled up position to the rolled down position;
    the guides of the first and second frame members guiding the flexible safety barrier sufficiently close to the work piece holder to eliminate sufficient space there between for a human being standing on the support surface; and
    a switch electrically connected to the tool and having an inoperative position preventing actuation of the tool and an operative position permitting actuation of the tool, the switch being biased to the inoperative position and being located so as to be responsive to engagement by the free end of the flexible barrier and to move from the first position to the second position only when the free end of the flexible barrier is in the rolled down position.

* * * * *

UNITED STATES PATENT AND TRADEMARK OFFICE
CERTIFICATE OF CORRECTION

PATENT NO. : 7,171,737 B2 Page 1 of 1
APPLICATION NO. : 10/661253
DATED : February 6, 2007
INVENTOR(S) : Sidlinger et al.

It is certified that error appears in the above-identified patent and that said Letters Patent is hereby corrected as shown below:

On the title page, item (73):
DELETE after Assignee: "GSG, LLC."

ADD after Assignee: --GENESIS SYSTEMS GROUP, LLC--

Signed and Sealed this

Sixteenth Day of October, 2007

JON W. DUDAS
*Director of the United States Patent and Trademark Office*